(12) United States Patent
Hudgin

(10) Patent No.: US 8,056,916 B2
(45) Date of Patent: Nov. 15, 2011

(54) DRIVE SYSTEM FOR HUMAN POWERED DEVICE

(76) Inventor: Louis Hudgin, Gilbert, AZ (US)

( * ) Notice: Subject to any disclaimer, the term of this patent is extended or adjusted under 35 U.S.C. 154(b) by 87 days.

(21) Appl. No.: 12/395,551

(22) Filed: Feb. 27, 2009

(65) Prior Publication Data

US 2010/0219605 A1 Sep. 2, 2010

(51) Int. Cl.
*B62M 1/12* (2006.01)
(52) U.S. Cl. ......... 280/233; 280/234; 280/253; 280/256
(58) Field of Classification Search ............... 280/233, 280/234, 253, 256
See application file for complete search history.

(56) References Cited

U.S. PATENT DOCUMENTS

| | | | |
|---|---|---|---|
| 86,856 A | 2/1869 | Monroe | |
| 519,384 A | 5/1894 | Gatling | |
| 551,667 A * | 12/1895 | Dunn | 280/234 |
| 565,556 A | 8/1896 | Murray | |
| 577,895 A | 3/1897 | Wales | |
| 581,985 A | 5/1897 | Fritz | |
| 582,315 A * | 5/1897 | Quinn | 280/234 |
| 598,026 A * | 1/1898 | Slippern | 280/234 |
| 1,595,857 A | 9/1925 | Coffman | |
| 2,225,230 A | 12/1940 | Ott | |
| 2,232,120 A * | 2/1941 | Letsch | 280/234 |
| 2,510,013 A * | 5/1950 | Edgar | 280/234 |
| 2,884,259 A * | 4/1959 | Snodgrass | 280/234 |
| 3,910,599 A | 10/1975 | Thomas | |
| 3,921,464 A * | 11/1975 | Greseth | 74/37 |
| 4,147,370 A * | 4/1979 | Lindsey, Jr. | 280/234 |
| 4,152,005 A | 5/1979 | Vanore | |
| 4,270,766 A | 6/1981 | Thomas | |
| 4,303,255 A | 12/1981 | Thomas | |
| 4,417,742 A | 11/1983 | Intengan | |
| 4,437,677 A | 3/1984 | Ksayian | |
| 4,541,647 A * | 9/1985 | Braun | 280/234 |
| 4,548,420 A * | 10/1985 | Patroni, Jr. | 280/224 |
| 4,685,692 A * | 8/1987 | Fullilove et al. | 280/234 |
| 4,705,284 A | 11/1987 | Stout | |
| 4,708,356 A | 11/1987 | Levavi | |
| 4,733,880 A | 3/1988 | Wilhelm, III | |
| 4,773,662 A * | 9/1988 | Phillips | 280/234 |
| 4,838,568 A | 6/1989 | Arroyo | |
| 4,858,942 A | 8/1989 | Rodriguez | |
| 5,002,298 A | 3/1991 | Motto | |
| 5,039,122 A * | 8/1991 | Deutch et al. | 280/234 |

(Continued)

FOREIGN PATENT DOCUMENTS

DE 3239548 4/1984

(Continued)

*Primary Examiner* — Joanne Silbermann
*Assistant Examiner* — Michael Stabley
(74) *Attorney, Agent, or Firm* — Booth Udall, PLC

(57) ABSTRACT

Drive systems configured to combine arm power with leg power are disclosed. A drive system may comprise an arm power headset comprising: a joint assembly configured to provide forward and aft movement; and a mounting bracket coupled to the joint assembly and configured to align the joint assembly. The drive system may further comprise: a push/pull rod configured to convert forward and aft arm movement into rotary movement, the push/pull rod coupling the arm power headset to a first drive assembly; the first drive assembly comprising a first drive sprocket coupled to a first crank shaft; a second drive assembly adjacent the first drive assembly; and a linking device linking the second drive assembly with the first drive assembly.

43 Claims, 10 Drawing Sheets

U.S. PATENT DOCUMENTS

| | | | | |
|---|---|---|---|---|
| 5,082,302 A | | 1/1992 | Nacar | |
| 5,209,506 A | | 5/1993 | Klopfenstein | |
| 5,280,936 A | | 1/1994 | Schmidlin | |
| 5,282,640 A | * | 2/1994 | Lindsey | 280/234 |
| 5,308,097 A | * | 5/1994 | Bono et al. | 280/234 |
| 5,328,195 A | * | 7/1994 | Sommer et al. | 280/233 |
| 5,372,374 A | * | 12/1994 | Hudson | 280/233 |
| 5,458,022 A | * | 10/1995 | Mattfeld et al. | 74/594.1 |
| 5,511,810 A | * | 4/1996 | Tong | 280/233 |
| 5,653,663 A | | 8/1997 | McCahon | |
| 5,700,228 A | | 12/1997 | James | |
| 5,775,708 A | | 7/1998 | Heath | |
| 5,785,336 A | | 7/1998 | Jang | |
| 5,816,598 A | | 10/1998 | Dodakian | |
| 5,908,199 A | | 6/1999 | Rigato | |
| 6,032,970 A | | 3/2000 | Porter | |
| 6,099,009 A | | 8/2000 | Schroeder | |
| 6,105,985 A | * | 8/2000 | Cosgrave | 280/248 |
| 6,155,584 A | | 12/2000 | Dallet | |
| 6,264,224 B1 | * | 7/2001 | Phillips | 280/234 |
| 6,554,309 B2 | | 4/2003 | Thir | |
| 6,572,129 B1 | * | 6/2003 | Bean | 280/234 |
| 6,688,623 B1 | | 2/2004 | Yunaska | |
| 7,000,934 B1 | * | 2/2006 | Capek | 280/234 |
| 7,413,206 B2 | * | 8/2008 | Pena et al. | 280/246 |
| 2007/0145708 A1 | | 6/2007 | Davioni | |
| 2007/0152421 A1 | * | 7/2007 | Pena et al. | 280/232 |

FOREIGN PATENT DOCUMENTS

| | | |
|---|---|---|
| DE | 3629851 | 3/1988 |
| DE | 102004055026 | 5/2006 |

* cited by examiner

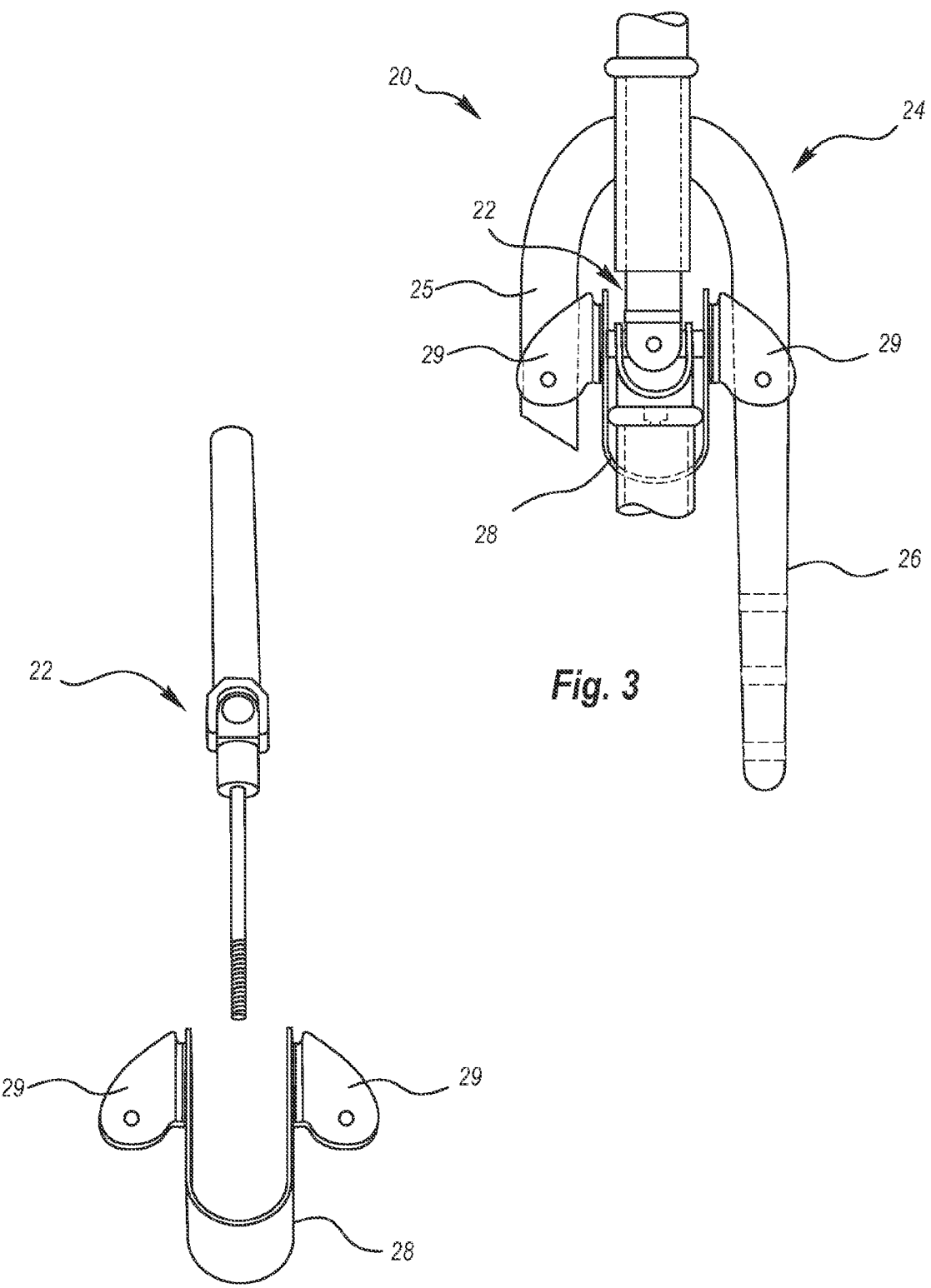

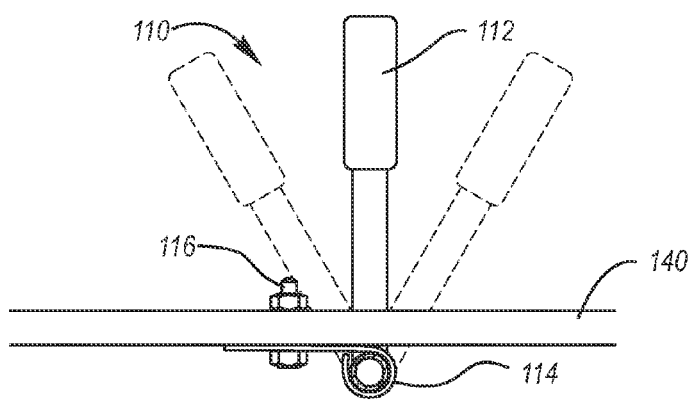
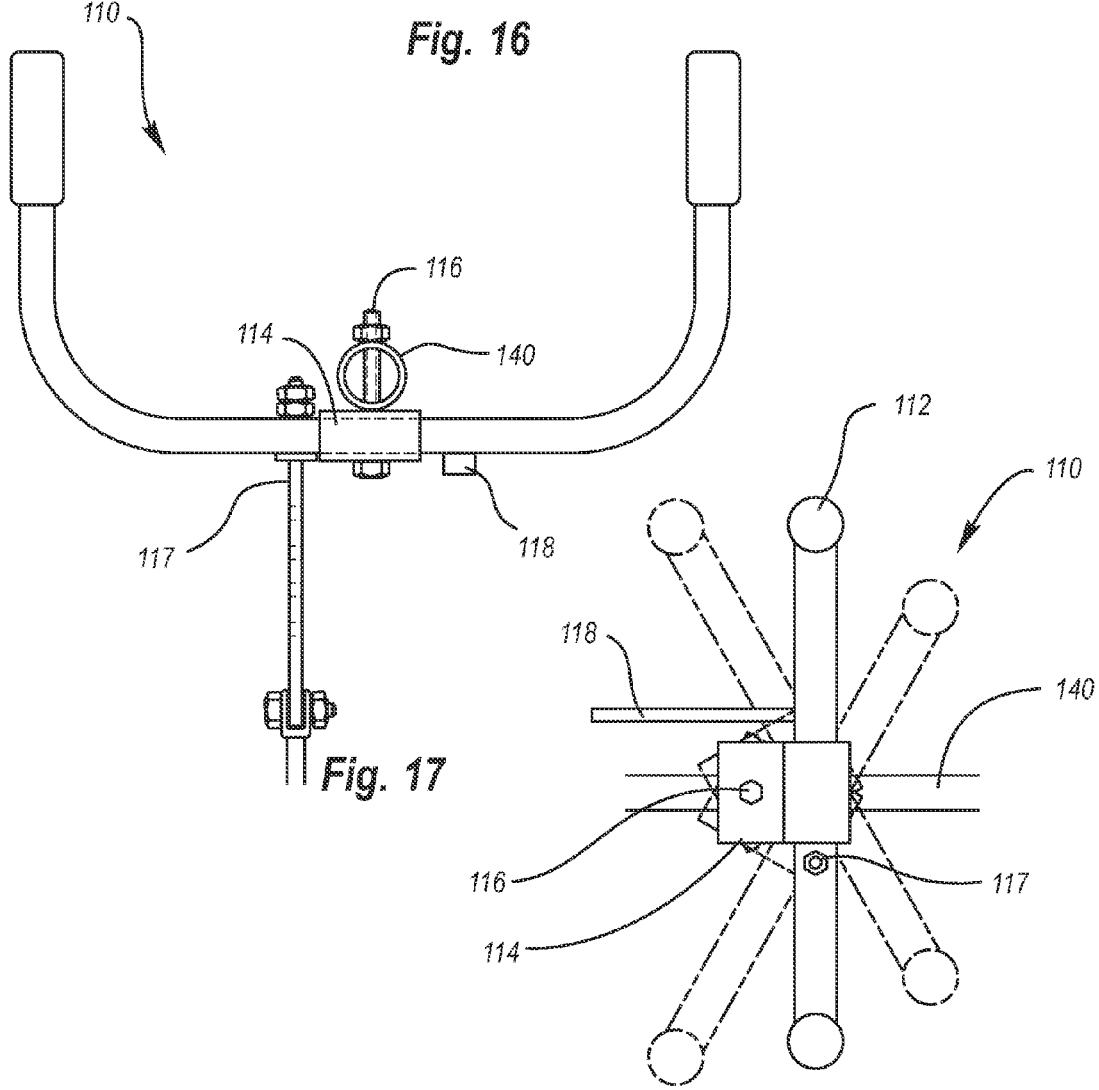

DRIVE SYSTEM FOR HUMAN POWERED DEVICE

BACKGROUND

1. Technical Field

Aspects of this document relate generally to a drive system for a human powered device.

2. Background

User-powered vehicles of many types have been developed. Such vehicles have the potential to be useful for general recreation, sports, physical exercise, and utility. A benefit sought to be achieved by conventional user-powered vehicles is exercise for the operator. To that end, some user-powered vehicles have been proposed for both leg- and arm-assisted drive. However, these vehicles are too clumsy, awkward, complicated, ineffective, dangerous, big, heavy, and the like for widespread public acceptance. Of the many previous attempts, none have provided a coordinated combination of significant additional power with familiar drivability, rideability, operability, and the like.

SUMMARY

Aspects of this document relate to drive systems for human powered devices. These aspects may comprise, and implementations may include, one or more or all of the components and steps set forth in the appended claims, which are hereby incorporated by reference.

In one aspect, a drive system for use with a cycle having at least one wheel is disclosed. The drive system may be configured to combine arm power of forward and aft movement of a handlebar with leg power of a sprocket and chain system to drive the at least one wheel of the cycle while providing for regular foot pedaling and steering of the cycle. The drive system may comprise an arm power headset configured to allow the handlebar to turn in a desired direction of travel while being moved forward and aft and while at a same time twist on a vertical axis to steer the cycle without adversely affecting either steering or powering of the cycle. The arm power head set may comprise: a universal joint assembly configured to provide forward and aft movement of and twisting movement inside the headset at the same time, thereby allowing for steering with the handlebar in a conventional manner; and a mounting bracket coupled to the universal joint assembly and a frame of the cycle. The drive system may also comprise: a push/pull rod configured to convert forward and aft arm movement into rotary movement, the push/pull rod coupling the arm power headset assembly to a first drive assembly; the first drive assembly comprising a first drive sprocket coupled to a first crank shaft; a second drive assembly on the same side of the cycle as the first drive assembly, the second drive assembly coaxially coupled and in driving relationship with a drive sprocket of the cycle; and a linking device linking the second drive assembly with the first drive assembly.

Particular implementations may include one or more or all of the following.

The universal joint assembly may comprise a universal joint. A lower portion of the universal joint comprises a wedge bolt that is configured to removably couple the universal joint assembly to a fork steer tube of the cycle.

The arm power head set may further comprise: an arm power fork configured to provide forward and aft movement, the arm power fork encompassing an upper portion of the universal joint assembly; and wherein the universal joint assembly couples the arm power fork to the frame of the cycle.

The arm power fork may comprise a partial prong and an opposing arm power prong extending below a forward and aft pivot point of the headset.

The mounting bracket may comprise pivotal adapters, such that forward and aft movement stresses of arm power is taken up by the mounting bracket as it holds the headset in a rigid position.

The first crank shaft may comprise a plurality of holes for removably coupling with the push/pull rod, thereby providing several adjustment choices along the first crankshaft where the push/pull rod could removably couple.

The first crankshaft of the first drive assembly may comprise: a groove; and a sliding connector that slidably and releasably engages within the groove, the sliding connector coupled with an end of the push/pull rod.

The push/pull rod may be removably coupled to a hole in a center of the first drive assembly, thereby eliminating forward and aft handlebar movement and arm power.

The first drive assembly may further comprise an axel operatively coupled with a mounting bracket, the mounting bracket coupled to the frame of the cycle.

The second drive assembly may comprise a second drive sprocket to which a crank shaft and pedal of the cycle is coupled.

The linking device may be one of a chain, a belt, a strap, and a cable.

The push/pull rod may be coupled in a fixed position on the first crankshaft, thereby providing continuous forward and aft handlebar movement and arm power.

The second drive sprocket and the first drive sprocket may be one of the same size and a different size. The second drive sprocket may be smaller than the first drive sprocket.

The drive system may further comprise one of at least one weight, a weighted filler, or a combination thereof to provide balance and consistent push/pull movements. The at least one weight may be coupled to one of the arm power prong, the first drive sprocket, and a combination thereof.

The handle bar may be T-shaped and comprise a stem; and the arm power headset may comprise: an adapter that couples the handlebar to the frame of the cycle, the lower portion of the adapter comprising a wedge bolt that is configured to removably couple the adapter to a front fork steer tube of cycle and wherein the upper portion of the adapter is pivotally coupled to the stem; and a collar assembly comprising a free collar and a pair of set collars, wherein the set collars are coaxially releasably mounted to the stem, and wherein the free collar is positioned between the set collars and is freely rotatable around the stem, thereby allowing twisting motion for steering, and wherein the free collar comprises an adapter configured to couple with the push/pull rod. The collar assembly may be movable and may be positioned at any location along the stem to provide the desired arm power and arm movement.

The steering of the cycle may comprise under seat steering. Accordingly, the handlebar may comprise a handle bar assembly comprising a U-shaped handle bar, a mounting bracket, a pivot bolt, and an arm power lever, wherein the mounting bracket rotatably receives the handlebar and is pivotally coupled to the frame of the cycle via pivot bolt opposite and under a seat of the cycle, and wherein the arm power lever is pivotally coupled to the handlebar adjacent the mounting bracket at one end and coupled to the push/pull rod at its other end. Alternatively, the handlebar may comprise a handle bar assembly comprising a U-shaped handle bar, a mounting housing, and an arm power lever, wherein the mounting housing is coupled to the frame under the seat and rotatably receives both the handlebar and the frame, and wherein the arm power lever is pivotally coupled to the handlebar adjacent the mounting housing at one end and coupled to the push/pull rod at its other end. Alternatively, the handlebar may comprise a handle bar assembly comprising a U-shaped handle bar, a mounting bracket, pivot grips, and an arm power lever, wherein the mounting bracket rotatably receives the handlebar and is coupled to the frame of the cycle opposite and under a seat of the cycle, wherein the pivot grips pivot to turn the cycle, and wherein the arm power lever is pivotally coupled to the handlebar adjacent the mounting bracket at one end and coupled to the push/pull rod at its other end.

The cycle may comprise one of a bicycle, a tricycle, a quadracycle, and a multi-person cycle. For a multi-person cycle, the drive system may further comprise: a second arm power assembly configured to allow a second handlebar to move forward and aft without adversely affecting powering of the cycle; and a second push/pull rod configured to convert forward and aft arm movement into rotary movement, the second push/pull rod coupling the second arm power headset assembly to the first drive assembly.

In another aspect, a drive system for a human powered device configured to combine arm power with leg power is disclosed. The drive system may comprise: an arm power headset comprising: a joint assembly configured to provide forward and aft movement; and a mounting bracket coupled to the joint assembly and configured to align the joint assembly. The drive system may further comprise: a push/pull rod configured to convert forward and aft arm movement into rotary movement, the push/pull rod coupling the arm power headset to a first drive assembly; the first drive assembly comprising a first drive sprocket coupled to a first crank shaft; a second drive assembly adjacent the first drive assembly; and a linking device linking the second drive assembly with the first drive assembly.

Particular implementations may include one or more or all of the following.

The joint assembly may comprise a universal joint, wherein the arm power headset is configured to allow forward and aft movement while at a same time twisting movement. A lower portion of the joint assembly may further comprise a wedge bolt.

The arm power head set may further comprise an arm power fork configured to provide forward and aft movement, the arm power fork encompassing an upper portion of the universal joint assembly. The arm power fork may comprise a partial prong and an opposing arm power prong extending below a forward and aft pivot point of the headset.

The mounting bracket may comprise pivotal adapters, such that forward and aft movement stresses of arm power is taken up by the mounting bracket as it holds the headset in a rigid position.

The first crank shaft may comprise a plurality of holes for removably coupling with the push/pull rod, thereby providing several adjustment choices along the first crankshaft where the push/pull rod could removably couple.

The first crankshaft of the first drive assembly may comprise: a groove; and a sliding connector that slidably and releasably engages within the groove, the sliding connector coupled with an end of the push/pull rod.

The push/pull rod may be removably coupled to a hole in a center of the first drive assembly, thereby eliminating forward and aft handlebar movement and arm power.

The first drive assembly may further comprise an axel operatively coupled with a mounting bracket, the mounting bracket coupled to the frame of the cycle.

The second drive assembly may comprise a second drive sprocket to which a crank shaft and pedal of the cycle is coupled.

The linking device may be one of a chain, a belt, a strap, and a cable.

The push/pull rod may be coupled in a fixed position on the first crankshaft, thereby providing continuous forward and aft handlebar movement and arm power.

The second drive sprocket and the first drive sprocket may be one of the same size and a different size. The second drive sprocket may be smaller than the first drive sprocket.

The drive system may further comprise one of at least one weight, a weighted filler, or a combination thereof to provide balance and consistent push/pull movements. The at least one weight may be coupled to one of the arm power prong, the first drive sprocket, and a combination thereof.

The human powered device may comprise one of a cycle, a stationary cycle trainer, a stationary exercise cycle, a water-propelled conveyance or aquatic device, a human powered generator, and an aircraft or glider. The cycle may comprise one of a bicycle, a tricycle, a quadracycle, and a multi-person cycle.

In still another aspect, a drive system configured to combine arm power with leg power is disclosed. The drive system may comprise an arm power headset comprising: a joint assembly configured to provide forward and aft movement; and a mounting bracket coupled to the joint assembly and configured to align the joint assembly. The drive system may further comprise: a push/pull rod configured to convert forward and aft arm movement into rotary movement, the push/pull rod coupling the arm power headset to a first drive assembly; the first drive assembly comprising a first drive sprocket coupled to a first crank shaft; a second drive assembly adjacent the first drive assembly; and a linking device linking the second drive assembly with the first drive assembly.

Particular implementations may include one or more or all of the following.

The joint assembly may comprise a universal joint, wherein the arm power headset is configured to allow forward and aft movement while at a same time twisting movement. A lower portion of the joint assembly may further comprise a wedge bolt.

The arm power head set may further comprise an arm power fork configured to provide forward and aft movement, the arm power fork encompassing an upper portion of the universal joint assembly. The arm power fork may comprise a partial prong and an opposing arm power prong extending below a forward and aft pivot point of the headset.

The mounting bracket may comprise pivotal adapters, such that forward and aft movement stresses of arm power is taken up by the mounting bracket as it holds the headset in a rigid position.

The first crank shaft may comprise a plurality of holes for removably coupling with the push/pull rod, thereby providing several adjustment choices along the first crankshaft where the push/pull rod could removably couple.

The first crankshaft of the first drive assembly may comprise: a groove; and a sliding connector that slidably and releasably engages within the groove, the sliding connector coupled with an end of the push/pull rod.

The push/pull rod may be removably coupled to a hole in a center of the first drive assembly, thereby eliminating forward and aft handlebar movement and arm power.

The first drive assembly may further comprise an axel operatively coupled with a mounting bracket, the mounting bracket coupled to the frame of the cycle.

The second drive assembly may comprise a second drive sprocket to which a crank shaft and pedal of the cycle is coupled.

The linking device may be one of a chain, a belt, a strap, and a cable.

The push/pull rod may be coupled in a fixed position on the first crankshaft, thereby providing continuous forward and aft handlebar movement and arm power.

The second drive sprocket and the first drive sprocket may be one of the same size and a different size. The second drive sprocket may be smaller than the first drive sprocket.

The drive system may further comprise one of at least one weight, a weighted filler, or a combination thereof to provide balance and consistent push/pull movements. The at least one weight may be coupled to one of the arm power prong, the first drive sprocket, and a combination thereof.

The foregoing and other aspects and implementations for cycles may have one or more or all of the following advantages: a handlebar that imparts power to a drive or a wheel during both aft and forward movement of the handlebar; a regular leg powered sprocket; regular steering; a universal joint allowing both forward/aft and rotational movement; and the slowing down of arms to achieve maximum efficiency. Additionally, drive system implementations can be employed as OEM or as a conversion kit such that a bicycle can be converted and unconverted without permanent changes to the bicycle. Furthermore, drive system implementations are a simple, easy to understand, natural transition from a leg only powered cycle to an efficient arm and leg powered one, such as, for example, by adding the arm power in a logical forward and aft motion to a standard handlebar with all the familiar controls and functions. In essence, the average rider can just get on and ride away with the least amount of new skills/training required. That is, the cycle operates and is controlled in every way like a conventional one and the only new skill that needs to be learned is the forward and aft movement of the arms to provide extra power.

Implementations for other human powered devices may have similar advantages.

The foregoing and other aspects, features, and advantages will be apparent to those of ordinary skill in the art from the DESCRIPTION and DRAWINGS, and from the CLAIMS.

BRIEF DESCRIPTION OF THE DRAWINGS

Implementations will hereinafter be described in conjunction with the appended DRAWINGS (which are not necessarily to scale), where like designations denote like elements.

FIG. 3 is a front view of a headset assembly of the drive system implementation of FIG. 1.

FIG. 4 is an exploded perspective view of a universal joint assembly of the headset assembly of FIG. 3.

FIG. 16 is a cross-sectional side view of an under-seat steering assembly of the drive system implementation of FIG. 15.

FIG. 17 is a rear view of the under-seat steering assembly of the drive system implementation of FIG. 15.

FIG. 18 is a top view of the under-seat steering assembly of the drive system implementation of FIG. 15.

DESCRIPTION

Figure 1:
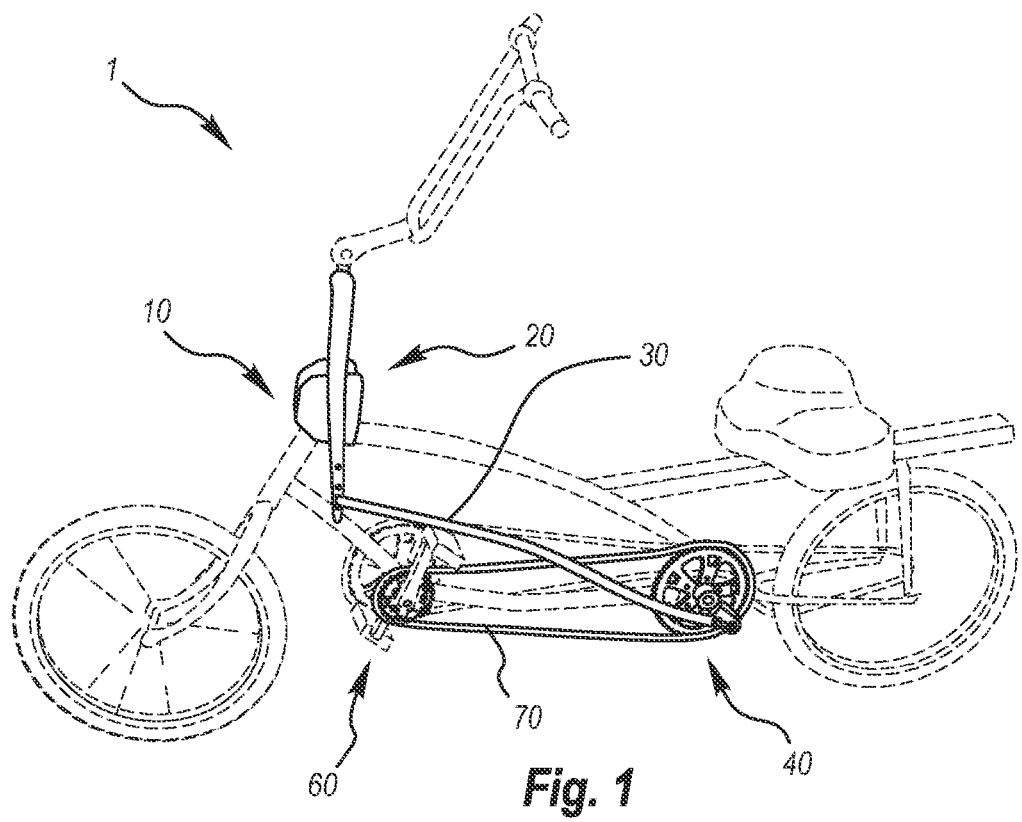
FIGS. 1 and 2 are side perspective views of a drive system implementation in conjunction with a recumbent bicycle.
Figure 2:
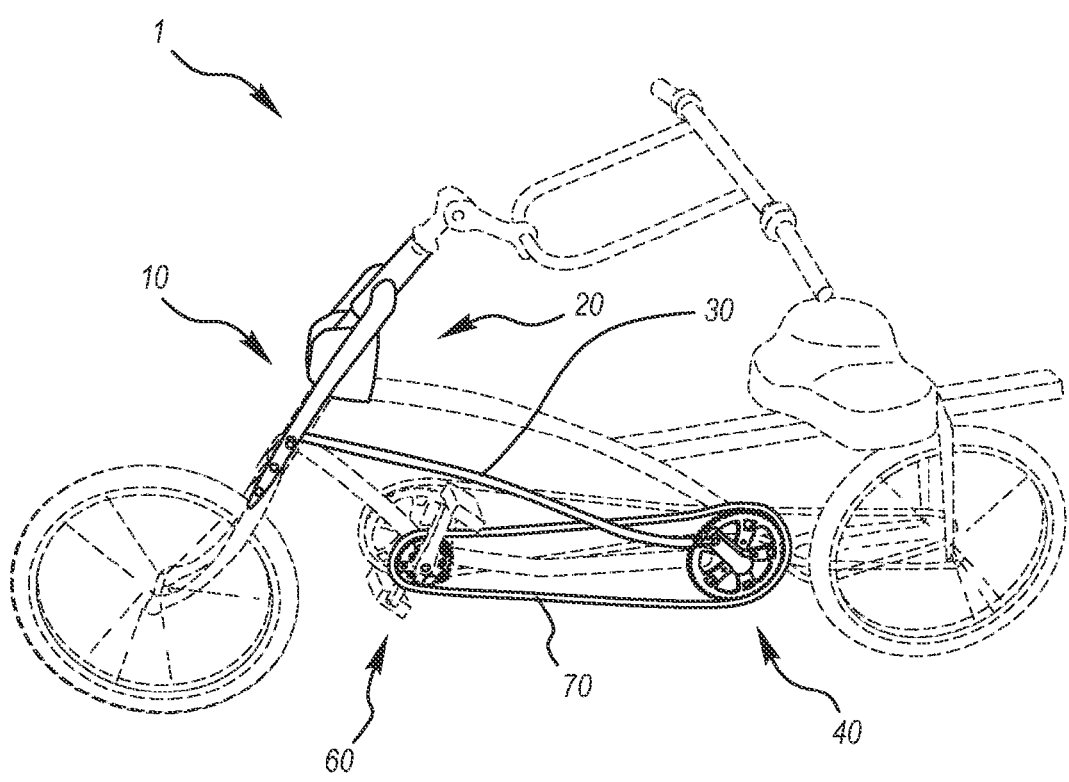
Figure 5:
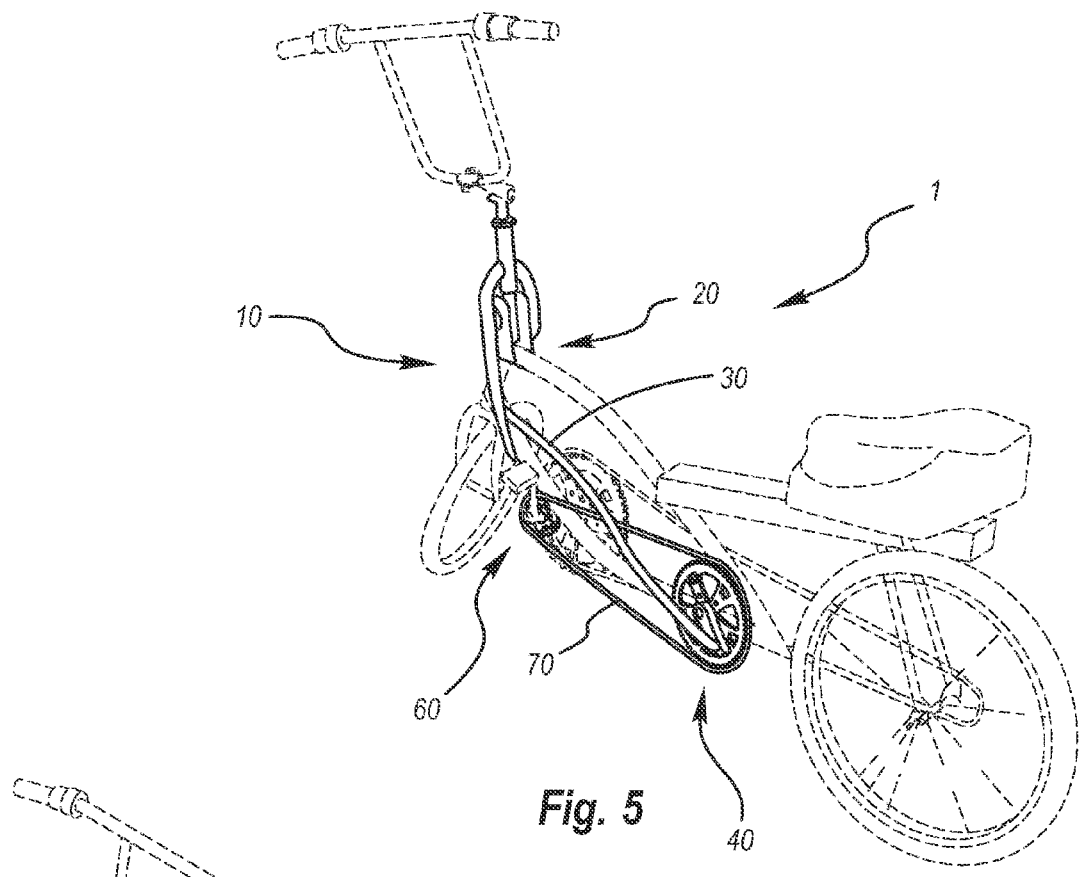
FIGS. 5 and 6 are rear perspective views of the drive system implementation of FIG. 1.
Figure 6:
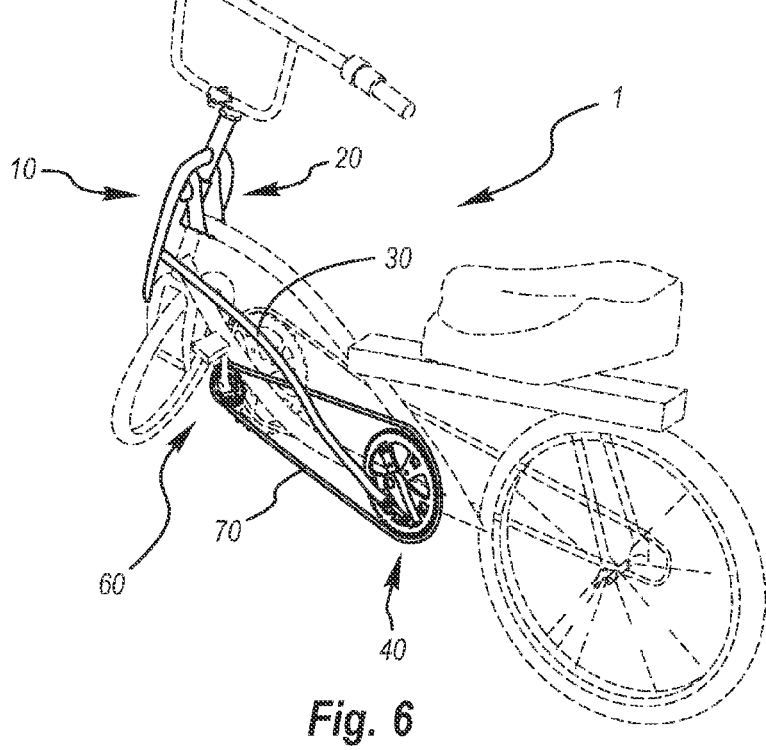

This document features drive systems for human powered devices. There are many features of drive systems disclosed herein, of which one, a plurality, or all features may be used in any particular implementation. Generally, drive system implementations may, for example, combine the use of arm power with leg power (e.g., conventional rotary, chain and sprocket leg power). Arm power may be provided by moving a handlebar for example in a forward and aft action and simultaneously steering and controlling a cycle in a conventional way with familiar components. Arm power can be provided at the same speed or any lesser speed (e.g., half speed) as that of leg power so that both the legs and arms of a user operate in their most efficient power and speed range.

In the following detailed description, reference is made to the accompanying DRAWINGS which form a part hereof, and which show by way of illustration possible implementations. It is to be understood that other implementations may be utilized, and structural, as well as procedural, changes may be made without departing from the scope of this document. As a matter of convenience, various components of a drive system will be described using exemplary materials, sizes, shapes, dimensions, and the like. However, this document is not limited to the stated examples and other configurations are possible and within the teachings of the present disclosure.

Various directional terms are used herein, including left, right, up, down, upward, downward, front, rear, forward, rearward, and the like. For clarity, these directional terms are based on the frame of reference of a human rider and presumes a direction of travel of a cycle or other device. "Down" and "downward" mean generally toward the surface on which the bicycle travels and "up" and "upward" mean generally away from the surface on which the cycle travels. "Forward" and "front" mean generally the direction in which the cycle travels and "aft", "rearward" and "rear" are generally the opposite thereof. Also, "turning" the cycle means changing the direction of travel of the cycle to the right or left.

Structure/Components

There are a variety of drive system implementations. Notwithstanding, turning to FIGS. 1-8 and for the exemplary purposes of this disclosure, drive (or arm/leg power) system 10 is shown in conjunction with recumbent bicycle 1.

Recumbent bicycle 1 may be any number of recumbent bicycles with known components. For example, recumbent bicycle 1 may have such components as, for example, a frame, a fork, rims, hubs, spokes, tires, pedals, a crank, a chain, rear cogs, a bottom bracket, a front derailleur, a rear derailleur, shifters, handlebars, a stem, a headset, brake calipers, brake levers, a seat, and the like. One particular recumbent bicycle suitable for use with drive system 10, or any other drive system implementation of this disclosure for that matter, is the Sparrow recumbent bicycle manufactured by Cycle Genius Recumbents, 6215-B Evergreen St., Houston, Tex. 77081-6813 (www.cyclegenius.com).

Thus, for example, bicycle 1 may comprise a frame, which supports a rear wheel drive mechanism having pedals, associated crank shafts, and a front drive sprocket. The rear wheel drive mechanism may utilize a chain to link the front drive sprocket with the rear wheel sprocket and an associated transmission linkage. Bicycle 1 may further include front and rear wheels and a seat for supporting a rider. The handlebar may include gear selectors, which permit changing of the bicycle's gears. The handlebar may also include front and rear brake levers, which may be used to control the front and rear brakes. The front wheel is rotationally secured to a fork, which may be pivotally controlled by the handlebar and by user manipulation of drive system 10.

Drive system 10 is configured to combine the arm power of forward and aft movement of a standard handlebar with the leg power of a normal sprocket and chain system to drive the rear wheel of bicycle 1, while providing for regular foot pedaling and steering of bicycle 1 in a conventional manner. Drive system 10 may comprise head set 20, push/pull rod 30, rear drive (or arm power) assembly 40, front drive (or leg power) assembly 60, and chain 70. Thus, drive system 10 uses only a few simple parts that allow headset assembly 20 to move forward and aft while at the same time twist on a vertical axis to steer the front wheel of bicycle 1. In drive system implementations that are not OEM, drive system 10 can be added and removed without permanent changes to bicycle 1.

Referring to FIGS. 3-4 in particular, arm power headset 20 is configured to allow the handlebar to turn the front wheel in the desired direction of travel while being pumped forward and aft at the same time without adversely affecting either the steering or powering of bicycle 1. Arm power headset 20 comprises universal joint assembly 22 that couples arm power fork 24 to the frame of bicycle 1.

Universal joint assembly 22 is configured to provide forward and aft movement and twisting movement inside the headset at the same time, thereby allowing for steering with the handlebar in a conventional manner. Universal joint assembly 22 comprises a universal joint operatively coupled with mounting bracket 28. The lower portion of universal joint assembly 22 comprises a wedge bolt that is configured to removably couple universal joint assembly 22 to the front fork steer tube of bicycle 1 with a common expanding wedge system. The wedge bolt may be integrally formed with or coupled to universal joint assembly 22 and it is secured in the steer tube like a conventional handle bar stem would be.

Mounting bracket 28 may be coupled to the main frame of bicycle 1 and is configured to align arm power fork 24 with universal joint assembly 22. Mounting bracket 28 comprises pivotal adapters, such as pivot bearing plates for example, coupled to frame braces 29. All the forward and aft pumping stresses of the arm power is taken up by mounting bracket 28 as it holds headset 20 in a rigid position.

Arm power fork 24 fits over universal joint assembly 22 as a normal headset fits over the front fork steer tube of a bicycle. Arm power fork 24 may use at least one steering bearing set. Arm power fork 24 comprises a partial prong 25 and an opposing arm power prong 26 extending below the forward and aft pivot point of headset 20 to keep the push/pull rod 30 out of the way. However, push/pull rod 30 could be mounted above the forward and aft pivot point of headset 20 and still have the same effectiveness.

Thus, headset 20 is an extended split head set hinged on bracket 28 attached to the main frame of bicycle 1 that allows forward and aft movement, while universal joint assembly 22 that incorporates a steering stem that allows forward and aft movement and twisting movement inside headset 20 at the same time.

Push/pull rod 30 is configured to convert forward and aft arm movement into rotary movement to conform to the rotary movement of the legs. Push/pull rod 30 connects headset assembly 20 to rear drive assembly 40. Push/pull rod may comprise any type of coupling ends suitable for connecting to crank shaft 44 and forward and aft arm power prong 26, consistent with the operation of drive system 10. For example, ends of push/pull rod may comprise a universal coupling.

Figure 8:
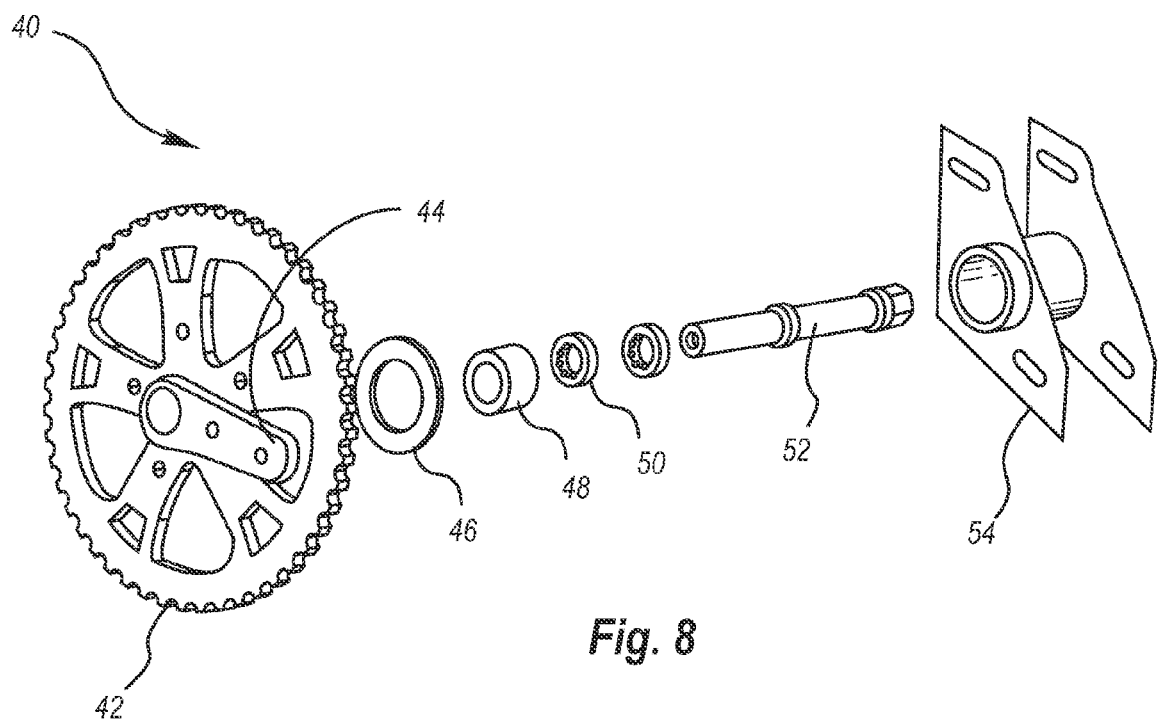
FIG. 8 is an exploded perspective view of a rear drive or arm power assembly of the drive system implementation of FIG. 1.

Referring to FIG. 8 in particular, rear drive (or arm power) assembly 40 comprises rear drive sprocket 42. Rear drive sprocket 42 is coupled to crank shaft 44 which comprises a plurality of holes (e.g., through holes, threaded holes, and the like) for removably coupling with push/pull rod 30. Washer 46, spacer 48, and bearings 50 are coaxially mounted with axel 52. Axel 52 is operatively coupled with mounting bracket 54 and also has a hole (e.g., through holes, threaded holes, and the like) in a free end thereof for removably coupling with push/pull rod 30 as desired by a user. Mounting bracket 54 may be coupled to any location on the frame of recumbent bicycle 1. In this particular implementation, mounting bracket 54 is coupled to a location on the frame of recumbent bicycle 1 between front drive assembly 60 and the rear wheel such that rear drive sprocket 42 and crank shaft 44 are located on the side of bicycle 1 opposite the side where the front drive sprocket, rear wheel drive mechanism, and chain of bicycle 1 are located.

Thus, a user has several adjustment choices along crankshaft 44 where push/pull rod 30 could removably couple. For example, if push/pull rod 30 was attached to the outermost hole on crankshaft 44, there will be forward or aft handlebar movement and arm power. Alternatively, if push/pull rod 30 is removably coupled to the hole in the free end of axel 52, there will be no forward or aft handlebar movement and no arm power (i.e., a neutral position).

Figure 7:
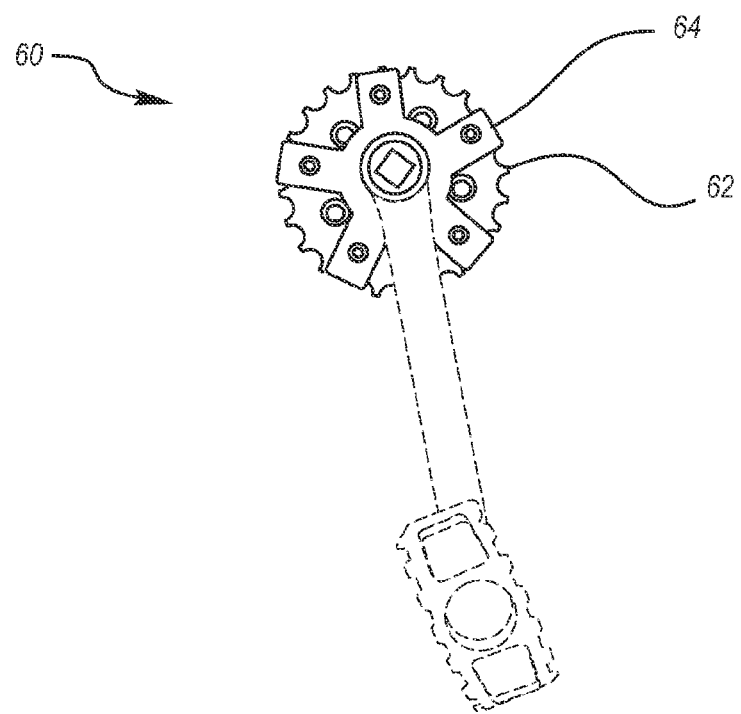
FIG. 7 is a front view of a front drive assembly of the drive system implementation of FIG. 1.

Referring to FIG. 7 in particular, front drive (or leg power) assembly 60 is coupled directly opposite, coaxially and in driving relationship with the front drive sprocket of bicycle 1 on the same side of bicycle 1 as drive assembly 40. Front drive assembly 60 comprises front drive sprocket 62 and adapter 64 to which a crank shaft and pedal of bicycle 1 is coupled.

Chain 70 or other suitable linking device such as levers, a belt, a strap, a cable, and the like, may be used to link front drive assembly 60 with rear drive assembly 40.

Thus, drive system 10 couples arm power with leg power to drive the rear wheel of bicycle 1, while providing for regular foot pedaling and steering of bicycle 1 in a conventional manner.

Other Implementations

Many additional drive system and cycle implementations are possible.

For the exemplary purposes of this disclosure, front drive sprocket 62 and rear drive sprocket 42 may be the same size. In such a scenario, a user's arms would travel at the same rate of speed as his feet and the arms may become ineffective at higher speeds. Most serious bicycle riders pedal at a rate of between 80 to 100 RPM. At that rate, a user's arms would produce very little if any assistance to the legs and maybe would even create some deficit. If pedaling is slowed down physically, then the arms become more effective but the legs become less effective. Alternatively, as depicted in FIGS. 1-8, front drive sprocket 62 (leg side) and rear drive sprocket 42 (arm side) may be different size. Such a mechanical arrangement slows a user's arms down while still allowing his legs to rotate in their most efficient range. For example, front drive sprocket 62 may be smaller than rear drive sprocket 42. As another example, front drive sprocket 62 may be half the size as rear drive sprocket 42, thereby allowing a user's arms to move at half the rate of his legs. The arms become much more effective at that speed and the combined power is much higher. Finally, a multiple gear system could also be employed if desired to provide many arm speed options. Notwithstanding, such an arrangement might lose the known synchronized rhythm of the arm and leg positioning provided by either full or half arm speed. However, other arm to leg speed combinations would still provide known synchronized rhythms, although more complicated.

For the exemplary purposes of this disclosure, push/pull rod 30 may be mounted in a fixed position on crankshaft 44 so that arm power may not be disconnected. Alternatively and for the exemplary purposes of this disclosure, another option would be to use two push/pull rods mounted slightly off center on crankshaft 44 in order to eliminate any dead spot so that arms only powering could be accomplished. For example, at least one flange may be integrally joined or coupled to the free end of the crankshaft. For example, the at least one flange may comprise two opposing flanges, each one coupled to an end of a different push/pull rod.

Figure 9:
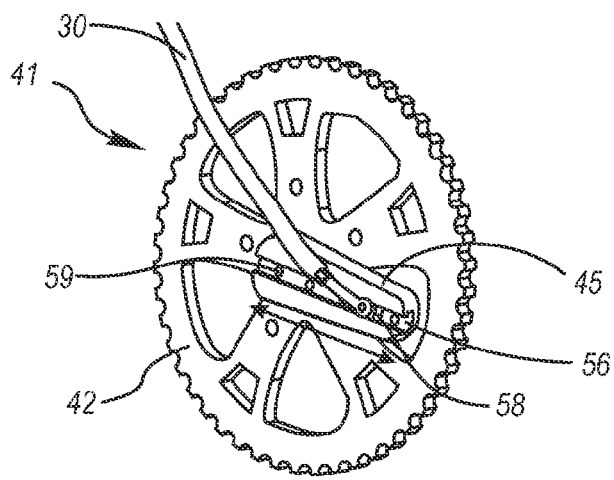
FIG. 9 is a perspective view of alternative rear drive or arm power assembly.

Alternatively and for the exemplary purposes of this disclosure and referring to FIG. 9, another rear drive (or arm power) assembly implementation is depicted. Rear drive 41 is similar to rear drive 40, the principal differences being crankshaft 45 and sliding connector 58. Specifically, crankshaft 45 comprises groove 56 which acts like a track.

In some implementations and as depicted in FIG. 9, groove 56 may also define a plurality of holes 59 spaced apart along its length. Sliding connector 58 may slidably and releasably engage with holes 59 within groove 56.

Alternatively and as a different option, groove 56 may not include any holes along its length. Instead, sliding connector 58 may slidably and releasably engage within groove 56 at any point along groove by a removable friction coupling or similar coupling that requires no use of tools, etc.

Regardless of the foregoing, sliding connector 58 may be coupled with an end of push/pull rod 30. Thus, rod 30 may be moved back and forth along crankshaft 45 to provide arm power or to render no handle bar movement.

Figure 10:
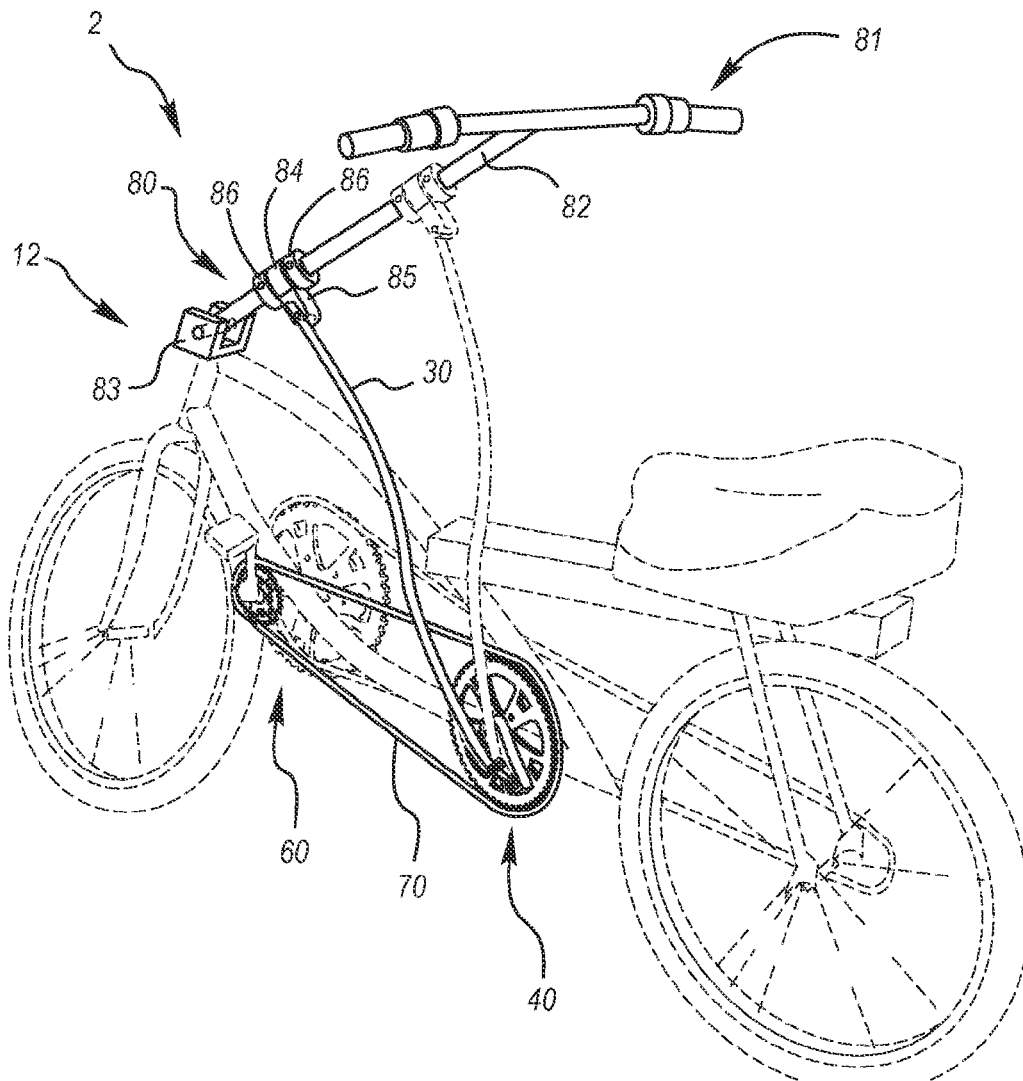
FIG. 10 is a rear perspective view of another drive system implementation in conjunction with another recumbent bicycle.

For the exemplary purposes of this disclosure and turning to FIG. 10, another drive system implementation and bicycle implementation are depicted. Drive system 12 and bicycle 2 are similar to drive system 10 and bicycle 1, the principal differences being headset 80 and handle bar 81. Specifically, handle bar 81 comprises a T-shape and includes a stem 82. Stem 82 is pivotally coupled to adapter 83 of head set 80.

Arm power headset 80 is configured to allow handlebar 81 to turn the front wheel in the desired direction of travel while being pumped forward and aft at the same time without adversely affecting either the steering or powering of bicycle 2. Arm power headset 80 comprises adapter 83 that couples handlebar 81 to the frame of bicycle 2.

Adapter 83 is configured to provide forward and aft movement and twisting movement at the same time, thereby allowing for steering with handlebar 81 in a conventional manner. The lower portion of adapter 83 may comprise a wedge bolt that is configured to removably couple adapter 83 to the front fork steer tube of bicycle 2 with a common expanding wedge system. The wedge bolt may be integrally formed with or coupled to adapter 83.

Arm power headset 80 also comprises a collar assembly comprising free collar 84 and set collars 86. Set collars 86 are coaxially releasably mounted to stem 82. Free collar 84 is positioned between set collars 86 and is free to rotate around stem 82, thereby allowing twisting motion for steering. Free collar 84 comprises adapter 85 which is configured to couple with push/pull rod 30. The collar assembly is movable and may be positioned at any location along stem 82 to provide the desired arm power and arm movement.

Figure 11:
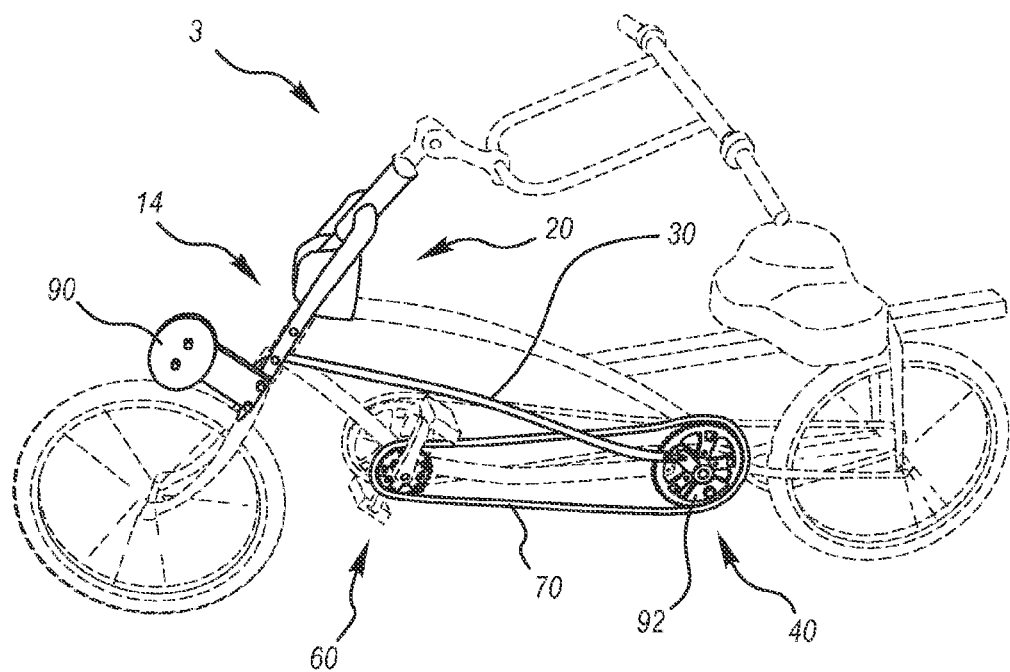
FIG. 11 is a side perspective view of still another drive system implementation in conjunction with still another recumbent bicycle.
Figure 12:
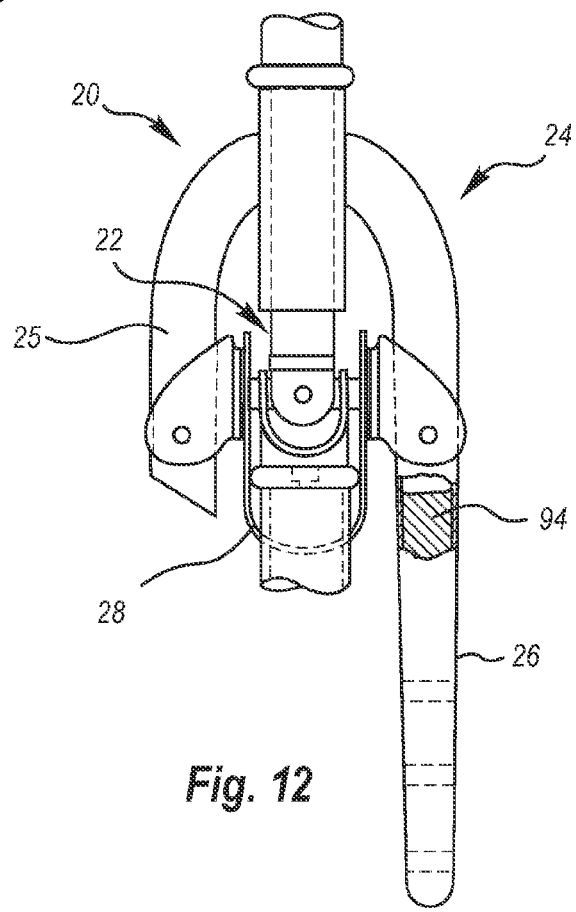
FIG. 12 is a front view of a headset assembly of the drive system implementation of FIG. 11.

For the exemplary purposes of this disclosure and referring to FIGS. 11-12, another drive system implementation and bicycle implementation are depicted. Drive system 14 and bicycle 3 are similar to drive system 10 and bicycle 1, the principal differences being weights 90 and 92 and weighted filler 94. Specifically, weights 90 and 92 may be coupled to prong 26 and rear drive sprocket 42 respectively. In addition, weighted filler 94 (e.g. lead) may be included inside prong 26. In other implementations one or any combination of weight 90, weight 92, and/or weighted filler 94 may be employed. Weights 90 and 92 and weighted filler 94, alone or in combination help to provide balance; so the push/pull movements are consistent. In other implementations, lighter handlebars (e.g., aluminum) could even be employed.

Figure 13:
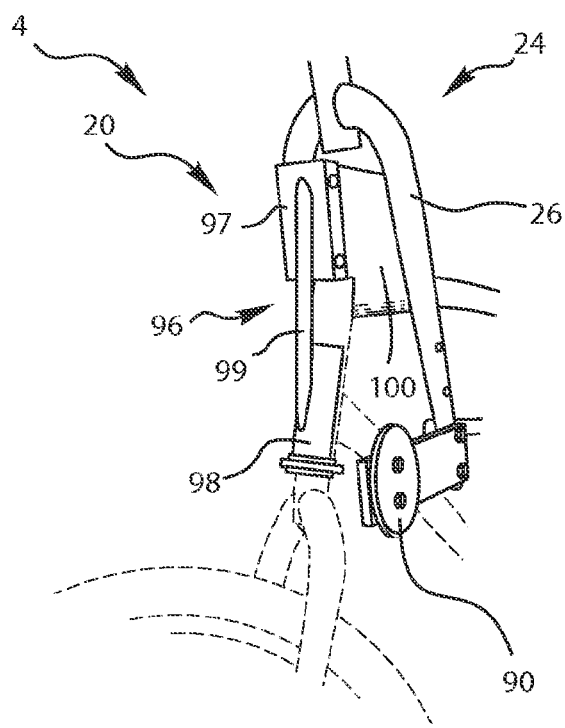
FIG. 13 is a front perspective view of yet another drive system implementation in conjunction with yet another recumbent bicycle.
Figure 14:
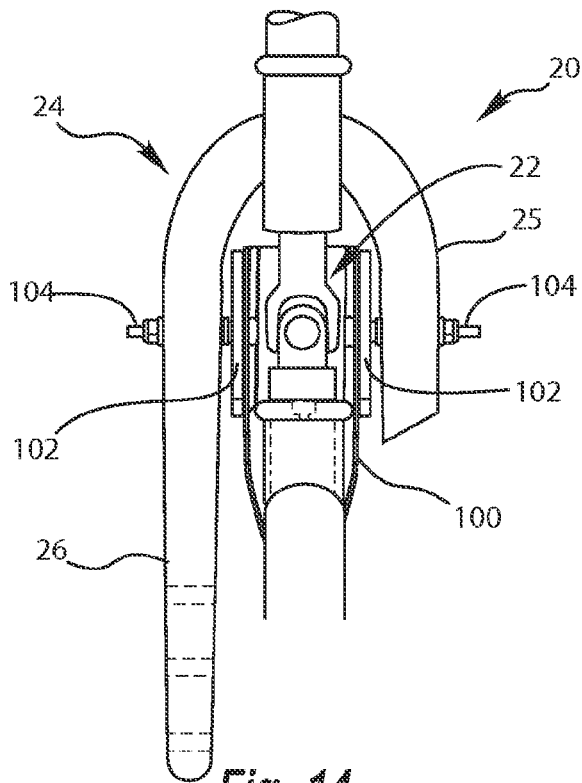
FIG. 14 is a rear view of a headset assembly of the drive system implementation of FIG. 13.
Figure 15:
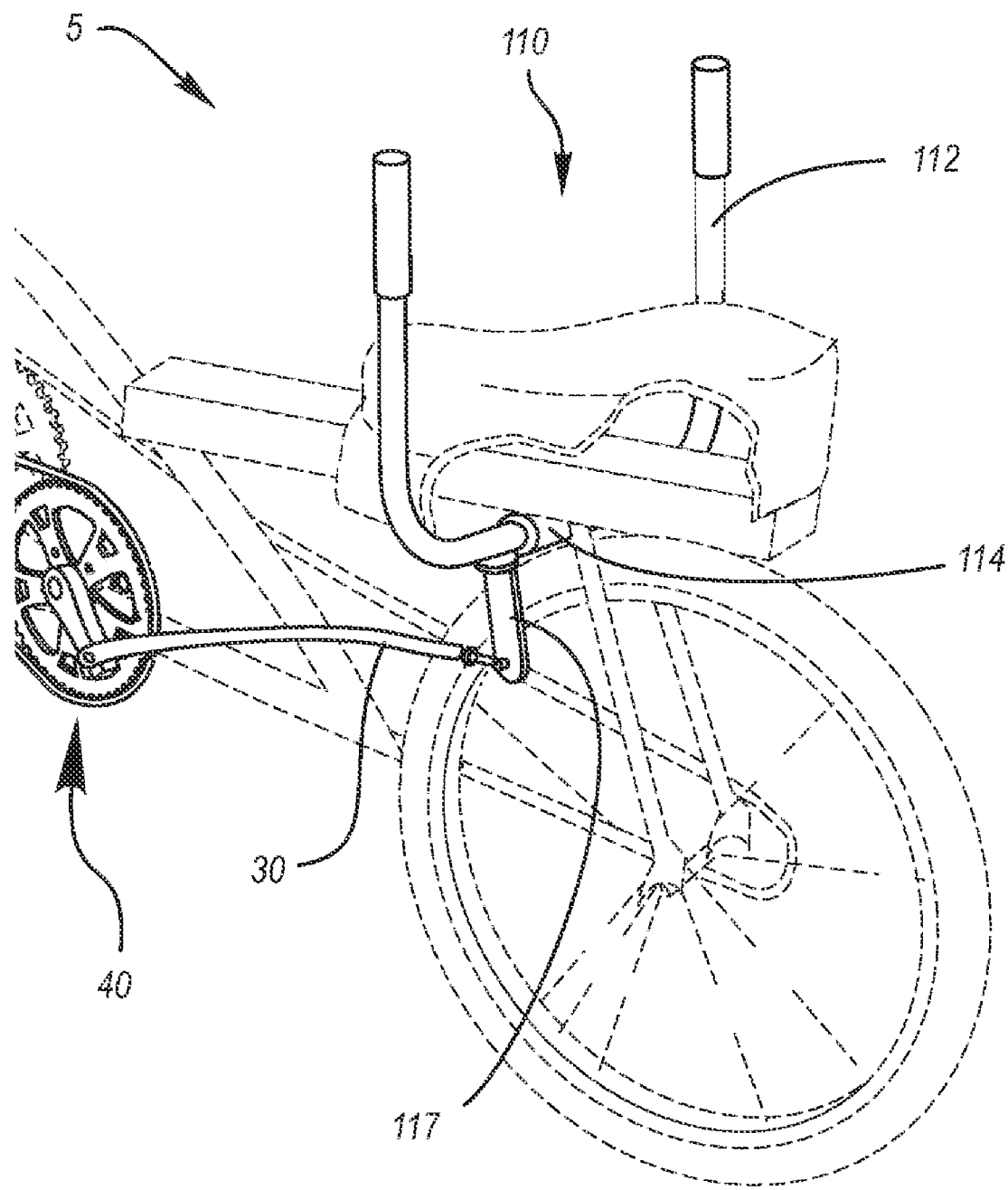
FIG. 15 is a rear perspective view of even another drive system implementation in conjunction with even another recumbent bicycle.

For the exemplary purposes of this disclosure and turning to FIGS. 13-14, another drive system implementation and bicycle implementation are depicted. This drive system implementation and bicycle 4 are similar to drive system 10 and bicycle 1, the principal differences being brace 96 and mounting bracket 100. Specifically, arm power headset 20 is configured to allow the handlebar to turn the front wheel in the desired direction of travel while being pumped forward and aft at the same time without adversely affecting either the steering or powering of bicycle 4. Arm power headset 20 comprises universal joint assembly 22 that couples arm power fork 24 to the frame of bicycle 4.

Universal joint assembly 22 is configured to provide forward and aft movement and twisting movement inside the headset at the same time, thereby allowing for steering with the handlebar in a conventional manner. In this implementation, universal joint assembly 22 comprises a universal joint operatively coupled with mounting bracket 100, instead of mounting bracket 28. The lower portion of universal joint assembly 22 comprises a wedge bolt that is configured to removably couple universal joint assembly 22 to the front fork steer tube of bicycle 4 with a common expanding wedge system. The wedge bolt may be integrally formed with or coupled to universal joint assembly 22 and it is secured in the steer tube like a conventional handle bar stem would be.

Mounting bracket 100 may be coupled to the main frame of bicycle 4 and is configured to align arm power fork 24 with universal joint assembly 22. Mounting bracket 100 may be further coupled to the frame of bicycle 4 via brace 96, which comprises housing brace 97 and steer tube brace 98 coupled together with connecting member 99. Housing brace 97 may be channel shaped. Steer tube brace 98 may be semi-annularly shaped.

Mounting bracket 100 comprises pivotal adapters 102, such as plates with holes there through, pivot bearing plates (e.g., aluminum block mounted roller bearing assemblies), pivot bushing plates (e.g., aluminum block mounted bushing assemblies), and the like for example, coupled to its walls. Mounting bracket 100 is coupled to fork 24 with pivot bolts 104. The forward and aft pumping stresses of the arm power may be taken up by mounting bracket 100 as it is assisted by brace 96 to hold headset 20 in a rigid position.

For the exemplary purposes of this disclosure and referring to FIGS. 15-20, other drive system implementations and bicycle implementations are depicted. These drive system implementations and bicycles 5, 6, and 7 are similar to drive system 10 and bicycle 1 respectively, the principal differences relating to under seat steering.

Specifically, and turning to FIGS. 15-18, handle bar assembly 110 is depicted. Handle bar assembly 110 comprises U-shaped handle bar 112, mounting bracket 114, pivot bolt 116, arm power lever 117, and steering linkage 118. Mounting bracket 114 is coupled to frame 140 via pivot bolt 116 opposite and under the seat. Mounting bracket 114 rotatably receives handlebar 112. Arm power lever 117 is pivotally coupled to handlebar 112 adjacent mounting bracket 114 at one end and coupled to push/pull rod 30 at its other end.

In use, handle bar assembly 110 is configured to allow handlebar 112 to turn the front wheel in the desired direction of travel while being pumped forward and aft at the same time without adversely affecting either the steering or powering of bicycle 5. Handlebar 112 is free to rotate within bracket 114 and can move forward and aft for arm power. In addition, bracket 114 can pivot as handlebar 112 is rotated left or right in the normal fashion for steering.

Figure 19:
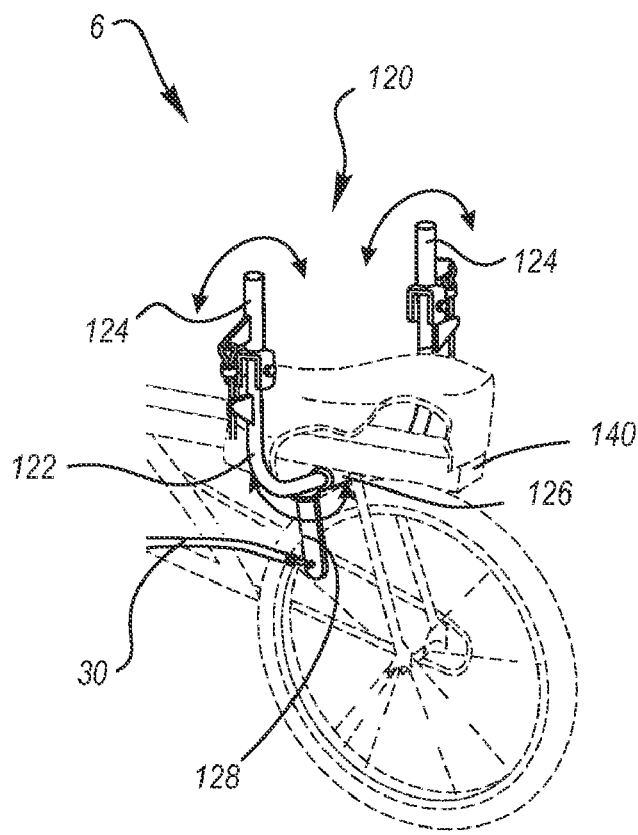
FIG. 19 is a rear perspective view of another drive system implementation in conjunction with another recumbent bicycle.

Turning to FIG. 19, handle bar assembly 120 is depicted. Handle bar assembly 120 comprises U-shaped handle bar 122, mounting bracket 126, pivot grips 124, and arm power lever 128. Mounting bracket 126 is coupled to frame 140 opposite and under the seat. Mounting bracket 126 rotatably receives handlebar 122. Arm power lever 128 is pivotally coupled to handlebar 122 adjacent mounting bracket 126 at one end and coupled to push/pull rod 30 at its other end.

In use, handle bar assembly 120 is configured to allow handlebar 122 to turn the front wheel in the desired direction of travel while being pumped forward and aft at the same time without adversely affecting either the steering or powering of bicycle 6. Handlebar 122 is free to rotate within bracket 126 and can move forward and aft for arm power. In addition, hand grips 124 can pivot and in conjunction with steering cables and brackets can turn bicycle 6 left or right in the appropriate fashion for steering.

Figure 20:
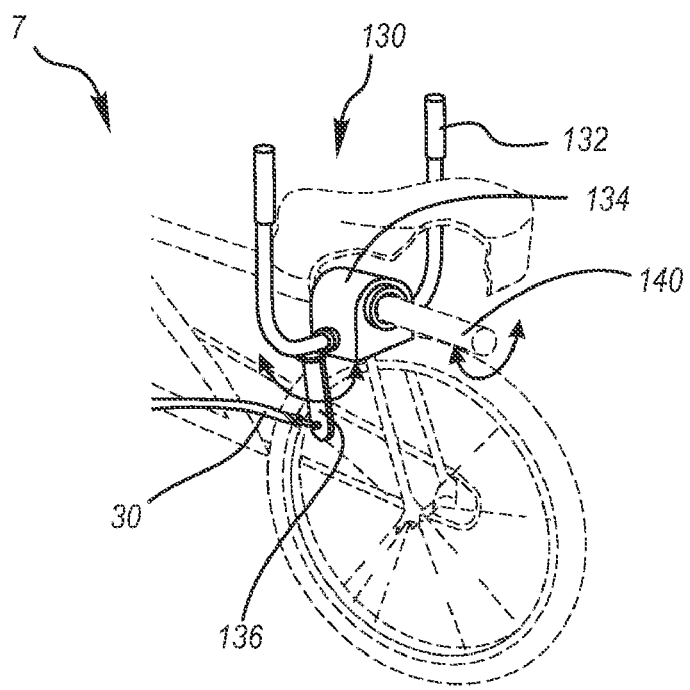
FIG. 20 is a rear perspective view of yet another drive system implementation in conjunction with yet another recumbent bicycle.

Turning to FIG. 20, handle bar assembly 130 is depicted. Handle bar assembly 130 comprises U-shaped handle bar 132, housing 134, and arm power lever 136. Housing 134 is coupled to frame 140 under the seat. Housing 134 rotatably receives handlebar 132 as well as frame 140. This may be accomplished by using bearings, bushings, and/or the like for example. Arm power lever 136 is pivotally coupled to handlebar 132 adjacent housing 134 at one end and coupled to push/pull rod 30 at its other end.

In use, handle bar assembly 130 is configured to allow handlebar 132 to turn the front wheel in the desired direction of travel while being pumped forward and aft at the same time without adversely affecting either the steering or powering of bicycle 7. Handlebar 132 is free to rotate within housing 134 and can move forward and aft for arm power. In addition, housing 134 can rotate around frame 140 as handlebar 132 is rotated left or right in the appropriate fashion for steering.

For the exemplary purposes of this disclosure, while drive system implementations may be used with bicycles, tricycles, and quadracycles for example, they may also be used with other cycles such as a multi-person cycle. For example, a multi-person cycle may comprise a tandem (i.e., one rider behind the other rather than the number of riders) or a juxtaposed cycle for example, or any other multi-person cycle (two or more riders). For example, on conventional tandems, the front rider steers the bicycle and is known as the captain, pilot, or steersman; the rear rider only pedals and is known as the stoker, navigator, or rear admiral. On most tandems the two sets of cranks are mechanically linked by a timing chain and turn at the same rate. Thus, for the exemplary purposes of this disclosure, a tandem recumbent bicycle for purposes of this disclosure may comprise the combination of bicycles of FIGS. 1-14 with any of the underseat steering implementations discussed with respect to FIGS. 15-20 (with the steering capabilities removed from either one), as well as, of course, any other components common for tandem bicycles. Thus, such a tandem bicycle would provide both the leg power and the arm power of at least two riders.

For the exemplary purposes of this disclosure, in some implementations, a universal joint could comprise a flexible cable for example.

Further implementations are within the claims.

Specifications, Materials, Manufacture, Assembly, and Installation

It will be understood that drive system implementations are not limited to the specific assemblies, devices and components disclosed in this document, as virtually any assemblies, devices and components consistent with the intended operation of a drive system implementation may be utilized. Accordingly, for example, although particular assemblies, devices and components are disclosed, such may comprise any shape, size, style, type, model, version, class, measurement, concentration, material, weight, quantity, and/or the like consistent with the intended operation of a drive system implementation. Implementations are not limited to uses of any specific assemblies, devices and components; provided that the assemblies, devices and components selected are consistent with the intended operation of a drive system implementation.

Implementations of drive system and implementing components may be constructed of a wide variety of materials. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof.

Some components defining drive assembly implementations may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve vacuum forming, injection molding, blow molding, casting, forging, cold rolling, milling, drilling, reaming, turning, grinding, stamping, pressing, cutting, bending, welding, soldering, hardening, riveting, punching, plating, and/or the like. Components manufactured separately may then be coupled or removably coupled with the other integral components in any manner, such as with adhesive, a weld joint, a solder joint, a fastener (e.g. a bolt and a nut, a screw, a rivet, a pin, and/or the like), washers, retainers, wrapping, wiring, any combination thereof, and/or the like for example, depending on, among other considerations, the particular material forming the components.

Thus, for the exemplary purposes of this disclosure, the components could be built from welded sheet metal and tubing by a frame builder. Or they could be either molded or cast and machined by a component manufacture. Or a combination of the parts made by both frame and component makers. The assemblies, devices and components could be manufactured permanently onto a bike frame for example or removably coupled (bolted or clamped) to the bike frame. Thus, while drive system implementations could be OEM, they could also be provided as an aftermarket conversion kit to be added to cycles or other devices without making any permanent alterations. Therefore, for example a bicycle could be converted back and forth from a stock bicycle to a bicycle implementation in about 30 minutes.

Use

Drive system implementations are not limited to recumbent bicycles or other bicycles or cycles having one, two, three, four, or more wheels. In some implementations, a drive system may be more efficient and better suited for recumbent and feet forward upright bicycles. Notwithstanding, any description relating to the foregoing is for the exemplary purposes of this disclosure, and implementations may also be used with similar results with a variety of other human powered devices or systems that may be powered and/or steered at the same time, for example, stationary cycle trainers (e.g., including a frame, a clamp to hold the cycle securely, a roller that presses up against a wheel, and a mechanism that provides resistance when the pedals are turned), stationary exercise cycles and other exercise devices that have pedals and a handlebar for example, velomobiles, cycle cars, and the like, water propelled conveyances that supply rotating vanes, paddles, or propellers on or in the water (e.g., pedalos, paddle boats, and the like), other aquatic devices, such as submarines and the like, human powered generators (e.g., electrical generators), human powered aircrafts, gliders, helicopters, and other flying-type devices, and the like.

In places where the description above refers to particular implementations of a drive system, it should be readily apparent that a number of modifications may be made without departing from the spirit thereof and that these implementations may be applied to other drive systems. The accompanying CLAIMS are intended to cover such modifications as would fall within the true spirit and scope of the disclosure set forth in this document. The presently disclosed implementations are, therefore, to be considered in all respects as illustrative and not restrictive, the scope of the disclosure being indicated by the appended CLAIMS rather than the foregoing DESCRIPTION. All changes that come within the meaning of and range of equivalency of the CLAIMS are intended to be embraced therein.

The invention claimed is:

1. A drive system for use with a cycle having at least one wheel, the drive system configured to combine arm power of forward and aft movement of a handlebar with leg power of a sprocket and chain system to drive the at least one wheel of the cycle while providing for regular foot pedaling and steering of the cycle, the drive system comprising:
   an arm power headset configured to allow the handlebar to turn in a desired direction of travel while being moved forward and aft and while at a same time twist on a vertical axis to steer the cycle without adversely affecting either steering or powering of the cycle, the arm power head set comprising:
   a universal joint assembly configured to provide forward and aft movement of and twisting movement inside the headset at the same time, thereby allowing for steering with the handlebar in a conventional manner; and
   a mounting bracket coupled to the universal joint assembly and a frame of the cycle;
   a push/pull rod configured to convert forward and aft arm movement into rotary movement, the push/pull rod coupling the arm power headset assembly to a first drive assembly;
   the first drive assembly comprising a first drive sprocket coupled to a first crank shaft;
   a second drive assembly on the same side of the cycle as the first drive assembly, the second drive assembly coaxially coupled and in driving relationship with a drive sprocket of the cycle; and
   a linking device linking the second drive assembly with the first drive assembly.

2. The system of claim 1, wherein the universal joint assembly comprises a universal joint.

3. The system of claim 2, wherein a lower portion of the universal joint comprises a wedge bolt that is configured to removably couple the universal joint assembly to a fork steer tube of the cycle.

4. The system of claim 1, wherein the arm power head set further comprises:
   an arm power fork configured to provide forward and aft movement, the arm power fork encompassing an upper portion of the universal joint assembly; and
   wherein the universal joint assembly couples the arm power fork to the frame of the cycle.

5. The system of claim 4, wherein the arm power fork comprises a partial prong and an opposing arm power prong extending below a forward and aft pivot point of the headset.

6. The system of claim 1, wherein the mounting bracket comprises pivotal adapters, such that forward and aft movement stresses of arm power is taken up by the mounting bracket as it holds the headset in a rigid position.

7. The system of claim 1, wherein the first crank shaft comprises a plurality of holes for removably coupling with the push/pull rod, thereby providing several adjustment choices along the first crankshaft where the push/pull rod could removably couple.

8. The system of claim 7, wherein the push/pull rod is removably coupled to a hole in a center of the first drive assembly, thereby eliminating forward and aft handlebar movement and arm power.

9. The system of claim 7, wherein the first drive assembly further comprises an axel operatively coupled with a mounting bracket, the mounting bracket coupled to the frame of the cycle.

10. The system of claim 1, wherein the second drive assembly comprises a second drive sprocket to which a crank shaft and pedal of the cycle is coupled.

11. The system of claim 1, wherein the linking device comprises one of a chain, a belt, a strap, and a cable.

12. The system of claim 1, wherein the push/pull rod is coupled in a fixed position on the first crankshaft, thereby providing continuous forward and aft handlebar movement and arm power.

13. The system of claim 1, wherein the second drive sprocket and the first drive sprocket are one of the same size and a different size.

14. The system of claim 13, wherein the second drive sprocket is smaller than the first drive sprocket.

15. The system of claim 1, wherein the first crankshaft of the first drive assembly comprises:
a groove; and
a sliding connector that slidably and releasably engages within the groove, the sliding connector coupled with an end of the push/pull rod.

16. The system of claim 1, further comprising one of at least one weight, a weighted filler, or a combination thereof to provide balance and consistent push/pull movements.

17. The system of claim 16, wherein the at least one weight is coupled to one of the arm power prong, the first drive sprocket, and a combination thereof.

18. The system of claim 1, wherein:
the handle bar is T-shaped and comprises a stem; and
the arm power headset comprises:
an adapter that couples the handlebar to the frame of the cycle, the lower portion of the adapter comprising a wedge bolt that is configured to removably couple the adapter to a front fork steer tube of cycle and wherein the upper portion of the adapter is pivotally coupled to the stem; and
a collar assembly comprising a free collar and a pair of set collars, wherein the set collars are coaxially releasably mounted to the stem, and wherein the free collar is positioned between the set collars and is freely rotatable around the stem, thereby allowing twisting motion for steering, and wherein the free collar comprises an adapter configured to couple with the push/pull rod.

19. The system of claim 18, wherein the collar assembly is movable and may be positioned at any location along the stem to provide the desired arm power and arm movement.

20. The system of claim 1, wherein the steering of the cycle comprises under seat steering, and wherein the handlebar comprises a handle bar assembly comprising a U-shaped handle bar, a mounting bracket, a pivot bolt, and an arm power lever, wherein the mounting bracket rotatably receives the handlebar and is pivotally coupled to the frame of the cycle via pivot bolt opposite and under a seat of the cycle, and wherein the arm power lever is pivotally coupled to the handlebar adjacent the mounting bracket at one end and coupled to the push/pull rod at its other end.

21. The system of claim 1, wherein the steering of the cycle comprises under seat steering, and wherein the handlebar comprises a handle bar assembly comprising a U-shaped handle bar, a mounting housing, and an arm power lever, wherein the mounting housing is coupled to the frame under the seat and rotatably receives both the handlebar and the frame, and wherein the arm power lever is pivotally coupled to the handlebar adjacent the mounting housing at one end and coupled to the push/pull rod at its other end.

22. The system of claim 1, wherein the steering of the cycle comprises under seat steering, and wherein the handlebar comprises a handle bar assembly comprising a U-shaped handle bar, a mounting bracket, pivot grips, and an arm power lever, wherein the mounting bracket rotatably receives the handlebar and is coupled to the frame of the cycle opposite and under a seat of the cycle, wherein the pivot grips pivot to turn the cycle, and wherein the arm power lever is pivotally coupled to the handlebar adjacent the mounting bracket at one end and coupled to the push/pull rod at its other end.

23. The system of claim 1, wherein the cycle comprises one of a bicycle, a tricycle, a quadracycle, and a multi-person cycle.

24. The system of claim 23, wherein the cycle comprises a multi-person cycle, and the drive system further comprises:
a second arm power assembly configured to allow a second handlebar to move forward and aft without adversely affecting powering of the cycle; and
a second push/pull rod configured to convert forward and aft arm movement into rotary movement, the second push/pull rod coupling the second arm power headset assembly to the first drive assembly.

25. A drive system for a human powered device configured to combine arm power with leg power, the drive system comprising:
an arm power headset comprising:
a universal joint configured to allow forward and aft movement while at a same time twisting movement; and
a mounting bracket coupled to the universal joint and configured to align the universal joint;
a push/pull rod configured to convert forward and aft arm movement into rotary movement, the push/pull rod coupling the arm power headset to a first drive assembly;
the first drive assembly comprising a first drive sprocket coupled to a first crank shaft;
a second drive assembly adjacent the first drive assembly; and
a linking device linking the second drive assembly with the first drive assembly.

26. The system of claim 25, wherein a lower portion of the universal joint further comprises a wedge bolt.

27. The system of claim 25, wherein the arm power head set further comprises an arm power fork configured to provide forward and aft movement, the arm power fork encompassing an upper portion of the universal joint.

28. The system of claim 27, wherein the arm power fork comprises a partial prong and an opposing arm power prong extending below a forward and aft pivot point of the headset.

29. The system of claim 25, wherein the mounting bracket comprises pivotal adapters, such that forward and aft movement stresses of arm power is taken up by the mounting bracket as it holds the headset in a rigid position.

30. The system of claim 25, wherein the first crank shaft comprises a plurality of holes for removably coupling with the push/pull rod, thereby providing several adjustment choices along the first crankshaft where the push/pull rod could removably couple.

31. The system of claim 30, wherein the push/pull rod is removably coupled to a hole in a center of the first drive assembly, thereby eliminating forward and aft handlebar movement and arm power.

32. The system of claim 30, wherein the first drive assembly further comprises an axel operatively coupled with a mounting bracket.

33. The system of claim 25, wherein the second drive assembly comprises a second drive sprocket.

34. The system of claim 25, wherein the linking device is one of a chain, a belt, a strap, and a cable.

35. The system of claim 25, wherein the push/pull rod may be coupled in a fixed position on the first crankshaft, thereby providing continuous arm power.

36. The system of claim 25, wherein the second drive sprocket and the first drive sprocket are one of the same size and a different size.

37. The system of claim 36, wherein the second drive sprocket is smaller than the first drive sprocket.

38. The system of claim 25, wherein the first crankshaft of the first drive assembly comprises:

a groove; and a sliding connector that slidably and releasably engages within the groove, the sliding connector coupled with an end of the push/pull rod.

39. The system of claim 25, further comprising one of at least one weight, a weighted filler, or a combination thereof to provide balance and consistent push/pull movements.

40. The system of claim 39, wherein the at least one weight is coupled to one of the arm power prong, the first drive sprocket, and a combination thereof.

41. The system of claim 25, wherein the human powered device comprises one of a cycle, a stationary cycle trainer, a stationary exercise cycle, a water-propelled conveyance or aquatic device, a human powered generator, and an aircraft or glider.

42. The system of claim 41, wherein the human powered device comprises one of a cycle, a stationary cycle trainer, and a stationary exercise cycle.

43. The system of claim 42, wherein the cycle comprises one of a bicycle, a tricycle, a quadracycle, and a multi-person cycle.

* * * * *